United States Patent [19]

Sprague et al.

[11] 4,415,915

[45] Nov. 15, 1983

[54] MULTILAYER INTERLEAVED ELECTRODES FOR MULTIGATE LIGHT VALVES

[75] Inventors: Robert A. Sprague, Saratoga; Lawrence N. Flores, Soquel, both of Calif.

[73] Assignee: Xerox Corporation, Stamford, Conn.

[21] Appl. No.: 248,939

[22] Filed: Mar. 30, 1981

[51] Int. Cl.³ .................... G01D 15/14; G02F 1/01
[52] U.S. Cl. .................................... 346/160; 350/356
[58] Field of Search ............ 346/153.1, 160, 107–108; 350/356

[56] References Cited

U.S. PATENT DOCUMENTS

| | | | |
|---|---|---|---|
| 4,125,318 | 11/1978 | Scibor-Rylski | 350/356 |
| 4,287,155 | 9/1981 | Tagawa | 346/155 |
| 4,316,196 | 2/1982 | Jacobs | 350/356 X |

OTHER PUBLICATIONS

"Light Gates Give Data Recorder Improved Hardcopy Resolution," *Electronic Design*, Jul. 19, 1979, pp. 31–32.
"Polarizing Filters Plot Analog Waveforms," *Machine Design*, vol. 51, No. 17, Jul. 26, 1979, p. 62.
"Data Recorder Eliminates Problem of Linearity," *Design News*, Feb. 4, 1980, pp. 56–57.

*Primary Examiner*—Thomas H. Tarcza

[57] ABSTRACT

To effectively reduce or even eliminate the gaps between the electrodes of a fringe field responsive multigate light valve, there are two or more layers of interleaved electrodes stacked on or very near the electro-optic element of the light valve. Fringe fields are effectively coupled into the electro-optic element of the light valve only when there is a suitable voltage drop between neighboring electrodes of adjacent electrode layers. To that end, the electrical impedance between neighboring electrodes within the same layer is selected to be substantially greater than the electrical impedance between neighboring electrodes within adjacent layers.

10 Claims, 7 Drawing Figures

MULTILAYER INTERLEAVED ELECTRODES FOR MULTIGATE LIGHT VALVES

This invention relates to fringe field responsive multigate light valves and, more particularly, to multilayer, interleaved electrode structures for such light valves.

BACKGROUND OF THE INVENTION

As is known, an electro-optic element having a plurality of individually addressable electrodes may be employed as a multigate light valve in, say, an electro-optic line printer. See a copending and commonly assigned U.S. patent application of R. A. Sprague et al., which was filed June 21, 1979 under Ser. No. 040,607 on a "TIR Electro-Optic Modulator with Individually Addressable Electrodes" (now U.S. Pat. No. 4,281,904). Also see, "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

Substantial progress has been made in developing such light valves and in applying them to electro-optic line printing. For example, a copending and commonly assigned U.S. patent application of R. A. Sprague, which was filed Sept. 17, 1980 under Ser. No. 187,911 on an "Electro-Optic Line Printer," now U.S. Pat. No. 4,389,659 shows that an image represented by a serial input data stream may be printed on a standard photosensitive recording medium through the use of a multistage light valve that is illuminated by a more or less conventional light source. That disclosure is of interest primarily because it teaches input data sample and hold techniques for minimizing the output power required of the light source. Another copending and commonly assigned U.S. patent application of W. D. Turner, which was filed Sept. 17, 1980 under Ser. No. 187,936 on "Proximity Coupled Electro-Optic Devices," reveals that the electrodes and the electro-optic element of a multigate light valve may be physically distinct components which are pressed or otherwise firmly held together to achieve "proximity coupling." Still another copending and commonly assigned U.S. patent application of R. A. Sprague et al. which was filed Sept. 17, 1980 under Ser. No. 188,171 on "Integrated Electronic for Proximity Coupled Electro-Optic Devices," (now U.S. Pat. No. 4,367,925) shows that it is relatively easy to make the necessary electrical connections to the many electrodes of a typical proximity coupled multigate light valve if the electrodes are formed by suitably patterning a metallization layer of, say, a VLSI silicon electrode driver circuit. Furthermore, yet another copending and commonly assigned U.S. patent application of W. D. Turner et al., which was filed Sept. 17, 1980 under Ser. No. 187,916 on "Differential Encoding for Fringe Field Responsive Electro-Optic Line Printers," teaches that the number of electrodes required of a multigate light valve to enable an electro-optic line printer to achieve a given resolution is reduced by a factor of two if the input data is differentially encoded.

Prior fringe field responsive multigate light valves. such as the TIR light valves described in several of the above-identified disclosures, have been characteristically configured so that all of the electrodes are effectively within a single plane. It has been recognized that there are potential advantages to reducing the spacing between the electrodes (i.e., the "interelectrode gap spacing"); not only to accommodate increased electrode densities, but also to obtain improved electro-optic efficiency. As will be appreciated, the resolution that can be achieved per unit width of such a light valve is directly dependent on the electrode density. However, another significant reason for being interested in reduced interelectrode gap spacings is the somewhat surprising finding that the strength of the electric fringe fields coupled into the electro-optic element of such a light valve seem to increase as the ratio of the interelectrode gap width to the center to center spacing of the individual electrodes decreases.

Unfortunately, a finite interelectrode gap spacing is required when the electrodes are all confined to a single plane. Indeed, the process used to fabricate the electrodes is likely to impose a lower limit on the interelectrode gap spacing that can be realized. For example, if the electrodes are formed photolithographically, the minimum obtainable interelectrode gap spacing is determined by the maximum available resolution of the photolithographic process.

SUMMARY OF THE INVENTION

In accordance with the present invention, to effectively reduce or even eliminate the gaps between the electrodes of a fringe field responsive multigate light valve, there are two or more layers of interleaved electrodes stacked on or very near the electro-optic element of the light valve. As in the prior art, the electrodes of each layer are spaced apart widthwise of the electro-optic element and have projections of substantial length along its optical axis. In keeping with this invention, however, the electrodes of each layer partially or completely fill the gaps between the electrodes of the other layer or layers as viewed from the optical axis of the electro-optic element.

An important feature of this invention is that electric fringe fields are effectively coupled into the electro-optic element of the light valve only when there is a suitable voltage drop between neighboring electrodes of adjacent electrode layers. To that end, the electrical impedance between neighboring electrodes within the same layer (i.e., the "intra-layer electrode insulating impedance") is selected to be substantially greater than the electrical impedance between neighboring electrodes within adjacent layers (i.e., the "inter-layer electrode insulating impedance").

As a general rule, a bilayer electrode construction is preferred. Of course, additional layers of electrodes may be used, provided that the fringe fields associated with the layer of electrodes furthermost from the electro-optic element penetrate into the electro-optic element sufficiently to effectively interact with the applied light beam.

If the input data is differentially encoded, all of the electrodes may be individually addressable. Alternatively, the electrodes of one layer may be used to define a ground or reference plane for the individually addressable electrodes of one or two adjacent layers.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
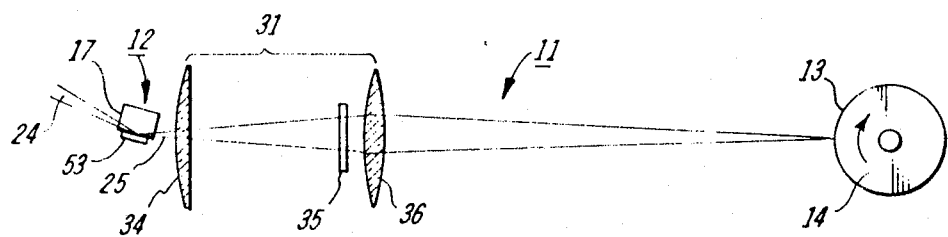
FIG. 1 is a schematic view of an electro-optic line printer having a TIR multigate light valve embodying the present invention.
Figure 2:
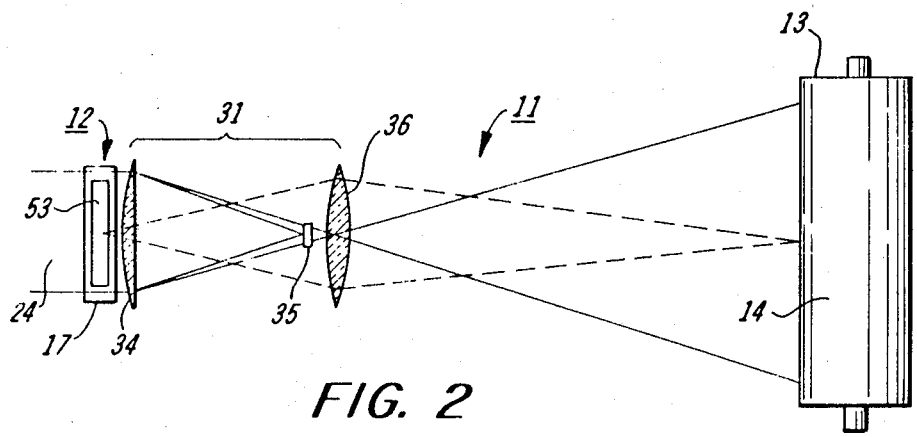
FIG. 2 is a schematic bottom plan view of the printer shown in FIG. 1.

Turning now to the drawings, and at this point especially to FIGS. 1 and 2, there is an electro-optic line printer 11 having a fringe field responsive multigate light valve 12 for printing an image on a photosensitive recording medium 13. As shown, the recording medium 13 is a photoconductively coated drum 14 which is rotated (by means not shown) in the direction of the arrow. Nevertheless, it will be evident that there are other xerographic and non-xerographic recording media that could be used, including photoconductively coated belts and plates, as well as photosensitive films and coated papers. Thus, in the generalized case, the recording medium 13 should be visualized as being a photosensitive medium which is exposed while advancing in a cross line or line pitch direction relative to the light valve 12.

Figure 3:
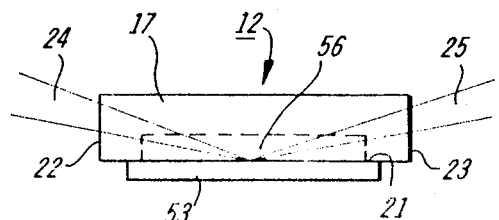
FIG. 3 is an enlarged side view of the TIR light valve.
Figure 5:
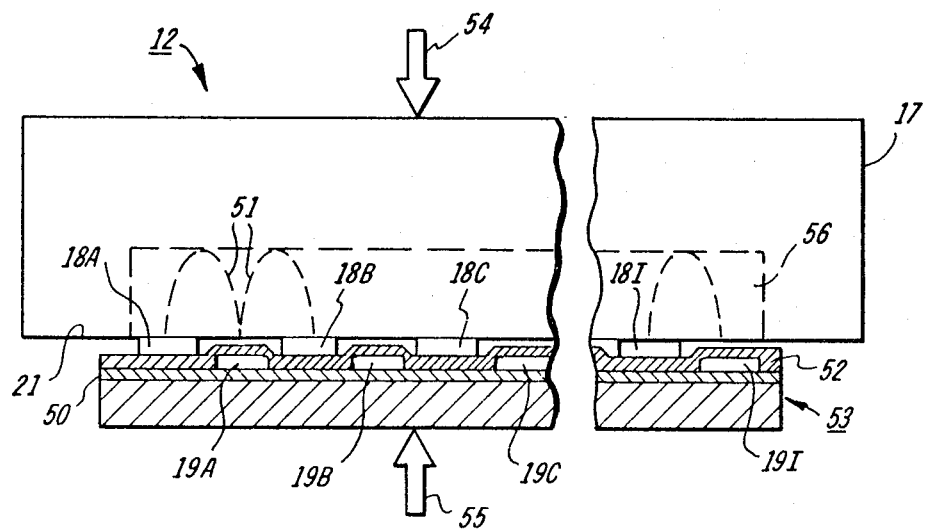
FIG. 5 is an enlarged, partially sectioned, fragmentary end view of the TIR light valve shown in FIG. 1 to illustrate its bilayer interleaved electrode construction.

As best illustrated in FIGS. 3 and 5, the light valve 12 comprises an optically transparent electro-optic element 17 and plural layers of individually addressable electrodes 18a–18i and 19a–19i, respectively. The most promising electro-optic materials for such a device presently appear to be $LiNbO_3$ and $LiTaO_3$, but there are others which warrant consideration, including BSN, KDP, $KD^xP$, $Ba_2NaNb_5O_{15}$ and PLZT. In this particular embodiment, the light valve 12 is operated in a TIR mode. Consequently, the electro-optic element 17 is suitably a y-cut crystal of, say, $LiNbO_3$ having an optically polished reflecting surface 21 extending between opposed, optically polished input and output faces 22 and 23, respectively.

Referring to FIGS. 1–3 for a description of the optics of the line printer 11, it will be seen that a sheet-like collimated light beam 24 is transmitted through the input face 22 of the electro-optic element 17 at a grazing angle of incidence relative to the reflecting surface 21 (i.e., an angle no greater than the critical angle of incidence for total internal reflectance from the reflecting surface 21). The input beam 24 is supplied by a suitable source, such as a laser, and is laterally expanded (by means not shown) so that it more or less uniformly illuminates substantially the full width of the electro-optic element 17. Moreover, the input beam 24 is brought to a wedge shaped focus (by means also not shown) on the reflecting surface 21 approximately midway through the electro-optic element 17 and is totally internally reflected therefrom to provide an output beam 25 which exits from the electro-optic element 17 through its output face 23.

As described in more detail hereinbelow, the phase front of the output beam 25 is spatially modulated in accordance with the differentially encoded data samples appearing on the electrodes 18a–18i and 19a–19i at any given point in time. Schlieren central dark field or bright field imaging optics are employed to convert the spatial phase front modulation of the output beam 25 into a correspondingly modulated intensity profile and to supply any magnification needed to obtain an image of the desired size on the recording medium 13. More particularly, as illustrated, there are central dark field imaging optics 31 comprising a field lens 34, a central stop 35, and an imaging lens 36. The field lens 34 is optically aligned between the output face 23 of the electro-optic element 17 and the stop 35 to focus substantially all of the zero order diffraction components of the output beam 25 onto the stop 35. The higher order diffraction components of the output beam 25 scatter around the stop 35. Thus, the imaging lens 36 is optically aligned between the stop 35 and the recording medium 13 to collect those components and to focus them on the recording medium 13, thereby providing an intensity modulated image of the light valve 12.

It should be noted that if the input beam 24 is polarized (by means not shown), the polarization of the output beam 25 may be spatially modulated by the light valve 12 in accordance with the differentially encoded data samples applied to the electrodes 18a–18i and 19a–19i. In that event, a polarization analyzer (also not shown) may be used to convert the spatial polarization modulation of the output beam 25 into a correspondingly modulated intensity profile. Accordingly, to generically cover the alternatives, the phase front or polarization modulation of the output beam 25 will be referred to as "p-modulation" and the read out optics 31 will be described as "p-sensitive optics" which are used to convert the p-modulation of the output beam 25 into a correspondingly modulated intensity profile.

Figure 4:
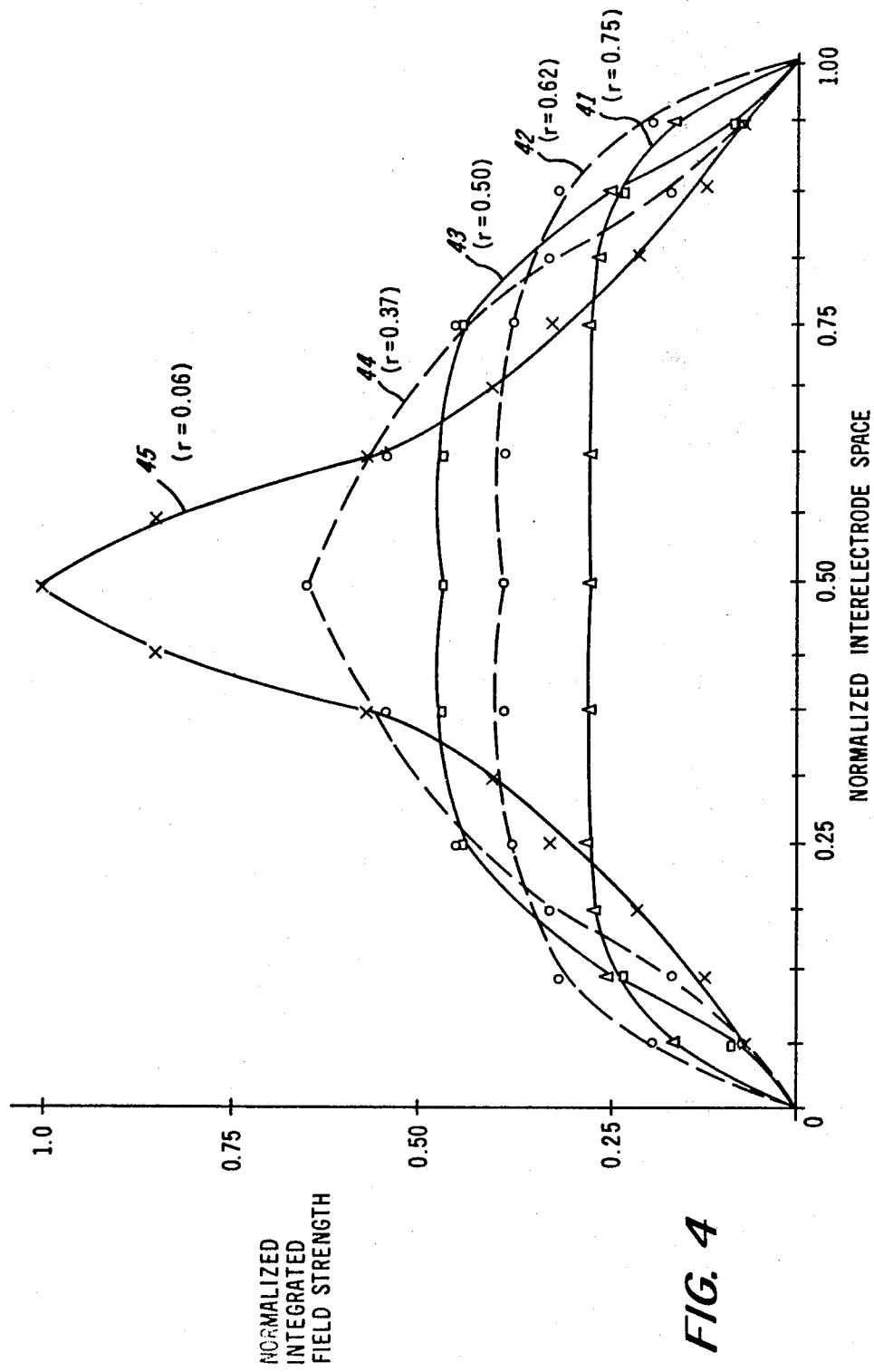
FIG. 4 is a normalized graph showing the calculated effective electric fringe field profile applied to the electro-optic element of a conventional TIR multigate light valve as a function of the ratio of inner-electrode gap to the spacing of the individual electrodes.

Turning to FIG. 4, it has been discovered that the ratio, r, of the interelectrode gap width to the center-to-center spacing of the individual electrodes seems to have a pronounced effect on the effective strengths of the electric fringe fields appearing within the electro-optic element of a TIR light valve. They, therefore, confirm that the effective strength of such a field increases as the aforementioned ratio, r, decreases. Each point on each of the curves 41–45 is an approximate summation of the local strengths of the fringe field acting on a given ray of an applied light beam at successive points along the length of the interaction region of a TIR light valve. In other words, the curves 41–45 are integrated profiles of interelectrode fringe field strengths as calculated on the basis of different interelectrode gap widths to electrode spacing ratios, r, for otherwise substantially identical light valves. Accordingly, they are a fair measure of the effective fringe field strengths resulting from the use of these different ratios, r.

As will be appreciated, the ratio, r, may be reduced by decreasing the interelectrode gap spacing and/or by increasing the width of the individual electrodes. Of course, if all of the electrodes of the light valve are confined to a single plane, a finite interelectrode gap spacing is required. Moreover, the width of the individual electrodes may not be significantly increased without paying a penalty in terms of the resolution that can be achieved.

Focusing now on FIG. 5, in accordance with the present invention, the electrodes 18a–18i and 19a–19i are in one plane and are interleaved with the electrodes 19a–19i, which are in another plane. In other words, the light valve 12 has two separate layers or sets of electrodes, 18a–18i and 19a–19i, respectively. Furthermore, the electrodes within each of these layers, say, the electrodes 18a–18i, are distributed across substantially the full width of the electro-optic element 17, preferably on equidistantly separated centers, and are laterally offset relative to the electrodes 19a–19i of the other layer. Typically, each of the electrodes 18a–18i and 19a–19i is 1–30 microns wide, and each layer or set of electrodes 18a–18i and 19a–19i, respectively, has an interelectrode gap spacing of 1–30 microns. In that event, a suitable inter-layer separation distance between the two sets of electrodes 18a–18i and 19a–19i, respectively, is on the order of 0.1–0.2 microns.

As will be understood, the electrodes 18a–18i partially or completely fill the gaps between the electrodes 19a–19i as viewed from the optical axis of the electro-optic element 17. Consequently, the composite interelectrode gap spacing (i.e., the gap, if any, between the interleaved electrodes 18a–18i and 19a–19i as viewed from the optical axis) may be selected to optimize the electro-optic response characteristics of the light valve 12, substantially independently of the aforementioned process dependent and resolution dependent limitations on the selection of the interelectrode gap width and center-to-center spacing, respectively, of the electrodes within any one layer or plane.

To spatially modulate the phase front or the polarization of the output beam 25 in accordance with the data applied to the electrodes 18a–18i and 19a–19i, any significant fringe fields 51 appearing between neighboring electrodes of adjacent electrode layers, such as the electrodes 18b and 19b, are coupled into the electro-optic element 17 of the light valve 12. An intermediate dielectric coating 52 or the like maintains the electrode layers 18a–18i and 19a–19i, respectively, in spaced apart relationship so that short circuits between neighboring electrodes of adjacent layers are avoided.

To efficiently couple the fringe fields 51 into the electro-optic element 17, the electrodes 18a–18i and 19a–19i and the intermediate dielectric coating 52 are supported on or very near the reflecting surface 21 thereof. More particularly, as shown, the electrodes 18a–18i and 19a–19i, a substrate dielectric coating 50, and the intermediate dielectric coating 52 are deposited in layers on a suitable substrate, such as a VLSI silicon circuit 53, which is pressed or othwerwise firmly held against the electro-optic element 17, as indicated by the arrows 54 and 55, to maintain the outermost layer of electrodes 19a–19i in contact with or closely adjacent to the reflecting surface 21. The advantage of this construction is that the VLSI circuit 53 may be used to make the necessary electrical connections to the electrodes 18a–18i and 19a–19i. Alternatively, however, it is conceivable that the electrodes 18a–18i and 19a–19i and the intermediate dielectric coating 52 could be deposited in layers directly on the reflecting surface 21 of the electro-optic element 17.

The output beam 25 is modulated in accordance with the data applied to the electrodes 18a–18i and 19a–19i because the fringe fields 51 create localized variations in the refractive index of the electro-optic element 17 widthwise of an interaction region 56 (FIG. 3). Preferably, the input and output beams 24 and 25 are both subjected to these refractive index variations. Thus, the electrodes 18a–18i and 19a–19i are elongated and either extend generally parallel to the optical axis of the electro-optic element 17 or are tilted (not shown) at the so-called Bragg angle relative to the axis so that the interaction region 56 is axially elongated.

Spurious fields caused by voltage drops between neighboring electrodes within the same electrode layer are suppressed because the impedance between these electrodes (i.e., the intra-layer electrode isolating impedance) is selected to be substantially greater than the impedance between neighboring electrodes of adjacent electrode layers (i.e., the inter-layer electrode isolating impedance). For example, if the space between the electrode layers 18a–18i and 19a–19i, respectively, and the interelectrode gap spaces of both of these electrode layers are more or less filled by the dielectric coating 52, the aforementioned impedance relationship is satisfied by selecting the interelectrode gap spacing to be at least an order of magnitude or so greater than the distance between the electrode layers.

Figure 6:
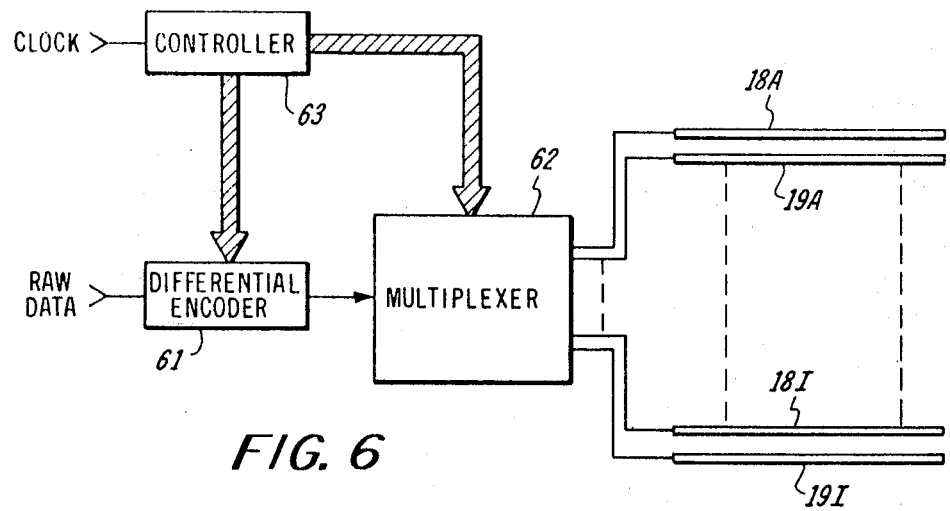
FIG. 6 is a simplified block diagram of a system for applying differentially encoded input data samples to the electrodes of the light valve shown in FIG. 5.

Turning to FIG. 6, it will be seen that the electrodes 18a–18i and 19a–19i are individually addressable. Therefore, to print an image, differentially encoded data samples for successive lines of the image are sequentially applied to the electrodes 18a–18i and 19a–19i in accordance with a staggering function which is matched to the interleaving of the electrodes 18a–18i and 19a–19i. For example, in the illustrated embodiment, such a match is obtained by applying successive ones of the differentially encoded data samples to successive electrodes 18a, 19a, 18b, 19b, etc.

To supply the differentially encoded data samples, serial input data samples representing adjacent picture elements for successive lines of an image are applied to a differential encoder 61 at a predetermined data rate. The encoder 61 differentially encodes those input samples and a multiplexer 62 ripples the encoded data samples onto the electrodes 18a, 19a, 18b, 19b, etc. at a ripple rate which is matched to the data rate. A controller 63 synchronizes the encoder 61 and the multiplexer 62. Of course, the input data may be buffered (by means not shown) to match the input data rate to any desired ripple rate. Moreover, the input data may be processed (by means also not shown) upstream of the encoder 61 for text editing, formatting, or other purposes.

As a matter of definition, each differentially encoded data sample, other than the first sample for each line of the image, has a magnitude which differs from the magnitude of the previous differentially encoded sample by an amount corresponding to the magnitude of a particular input data sample. The first differentially encoded sample for each line of the image is referenced to a predetermined potential, such as ground. Thus, when the differentially encoded data samples for any given line of an image are applied to the electrodes 18a–18i and 19a–19i, all picture elements for that line are faithfully represented by the voltage drops appearing between respective pairs of neighboring electrodes of the adjacent electrode layers. Preferably, the differentially encoded data samples are binary digital data so that there is no latent ambiguity in the response of the light valve 12.

It will be evident that there are many variations to the present invention. For example, the embodiment of FIG. 6 may be modified by referencing one of the layers of electrodes, say, the electrodes 18a–18i, to a reference potential, such as ground (not shown). If that is done, the input data is not differentially encoded. Instead, the row input data samples are sequentially applied on a line-by-line basis to the other, individually addressable electrodes 19a–19i. The major disadvantage of this alternative is that twice as many electrodes are required to achieve the same resolution.

Figure 7:
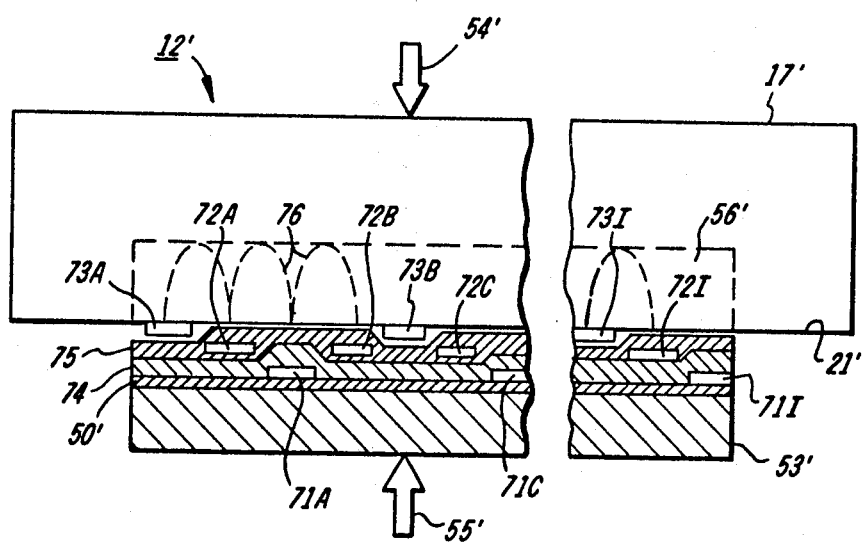
FIG. 7 is an enlarged, partially sectioned, fragmentary end view of a TIR multigate light valve having a trilayer interleaved electrode structure in keeping with this invention.

As shown in FIG. 7 another possible alternative is to employ three or more layers of interleaved electrodes 71a–71i, 72a–72i and 73a–73i, respectively, which are separated from one another by intermediate dielectric coatings 74 and 75, respectively. The principal limitation on this approach is that the fringe fields 76 originating on and/or terminating on the layer of electrodes 71a–71i that is most remote from the electro-optic element 17 must penetrate into the electro-optic element 17 sufficiently to contribute to the modulation of the output beam 25.

CONCLUSION

In view of the foregoing, it will now be understood that the present invention provides a multi-gate light valve which can be configured for optimum electro-optic efficiency and/or optimum resolution, substantially independently of the limitations attributable to conventional electrode fabrication processes. In particular, it will be appreciated that the composite interelectrode gap spacing of the interleaved, layered electrodes provided in accordance with this invention may be reduced for improved electro-optic efficiency and/or for increased resolution, even if standard interelectrode gap widths and electrode spacings are employed for each layer of electrodes.

What is claimed is:

1. A multigate light valve comprising
   an electro-optic element, and
   at least two layers of electrodes stacked one upon another on one side of said electro-optic element for coupling electric fringe fields into said element;
   each of said layers including a plurality of spaced apart, electrically insulated electrodes which are interleaved with and electrically insulated from the electrodes of each of the other layers, and
   said electrodes having substantially greater intra-layer impedance than inter-layer impedance, whereby fringe fields between neighboring electrodes of adjacent layers are coupled into said electro-optic element while fringe fields between neighboring electrodes of any one layer are suppressed.

2. The multigate light valve of claim 1 wherein said electrodes are all individually addressable.

3. The multigate light valve of claim 1 further including
   a substrate for supporting said electrodes, and
   means for maintaining said substrate closely adjacent to said electro-optic element, whereby said fringe fields are proximity coupled into said electro-optic element.

4. The multigate light valve of claim 3 wherein said substrate is an integrated circuit for making electrical connections to said electrodes.

5. The multigate light valve of claim 4
   wherein said electrodes are all individually addressable, and
   further including means for applying differentially encoded data samles to said electrodes to create said fringe fields.

6. An electro-optic line printer comprising the combination of
   a multigate light valve including
   an optically transparent electro-optic element having a reflecting surface disposed between an input face and an output face, and
   plural layers of electrodes stacked one upon another closely adjacent the reflecting surface of said electro-optic element, each of said layers including a plurality of spaced apart, electrically insulated electrodes which are interleaved with and electrically insulated from the electrodes of each of the other layers, the electrodes of each of said layers being distributed widthwise of said electro-optic element,
   means for illuminating substantially the full width of said electro-optic element with a light beam, said light beam being applied to said electro-optic element at a grazing angle of incidence relative to said reflecting surface and being brought to a wedge shaped focus on said said surface for total internal reflection therefrom,
   means for applying successive sets of data samples to said electrodes for creating fringe fields which sequentially spatially modulate said light beam in accordance with respective picture elements for successive lines of an image,
   a photosensitive recording medium, and
   means aligned between said electro-optic element and said recording medium for converting the spatial modulation of said light beam into a corresponding intensity profile, whereby successive lines of said image are sequentially printed on said recording medium.

7. A line printer of claim 6 wherein
   there are only two layers of electrodes, and
   said electrodes being insulated from one another by substantially greater inter-layer impedance than intra-layer impedance, whereby fringe field between neighboring electrodes of different ones of said layers are coupled into said electro-optic element to modulate said light beam, while fringe fields between neighboring electrodes of any one of said layers are suppressed.

8. The line printer of claim 7 further including
   a substrate for supporting said electrodes, and
   means for maintaining said substrate closely adjacent to said electro-optic element, whereby said light beam modulating fringe fields are proximity coupled into said electro-optic element.

9. The line printer of claim 8 wherein said substrate is an integrated circuit for making electrical connections to said electrodes.

10. The line printer of claim 9
    wherein said electrodes are all individually addressable, and
    further including means for applying differentially encoded data samples to said electrodes to create said light beam modulating fringe fields.

* * * * *